15-335 SR
10/7/86 OR RE 32,257

United States Patent [19]

Dyson

[11] E Patent Number: Re. 32,257

[45] Reissued Date of Patent: Oct. 7, 1986

[54] VACUUM CLEANING APPLIANCES

[75] Inventor: James Dyson, Bath, England

[73] Assignee: Prototypes, Ltd., Bath, England

[21] Appl. No.: 677,365

[22] Filed: Dec. 3, 1984

Related U.S. Patent Documents

Reissue of:

[64] Patent No.: 4,377,882
Issued: Mar. 29, 1983
Appl. No.: 247,871
Filed: Mar. 26, 1981

[30] Foreign Application Priority Data

Mar. 26, 1980 [GB] United Kingdom ..... 8010098

[51] Int. Cl.[4] ..... A47L 5/32
[52] U.S. Cl. ..... 15/335; 15/346
[58] Field of Search ..... 15/331, 334, 335, 337, 15/346

[56] References Cited

U.S. PATENT DOCUMENTS

| | | | |
|---|---|---|---|
| 1,338,791 | 5/1920 | Replogle | 15/335 |
| 2,504,846 | 4/1950 | Kirby | 15/335 X |
| 2,867,833 | 1/1959 | Duff | 15/337 X |

*Primary Examiner*—Chris K. Moore
*Attorney, Agent, or Firm*—Ian C. McLeod

[57] ABSTRACT

This invention relates to a vacuum cleaning appliance which is convertible to act both as an upright type cleaner or a cylinder type cleaner.

The main air passageway through the appliance includes a motor driven suction fan unit and a valve device which is operable to connect the passageway either with an air inlet in a carpet engaging section or with an air inlet in a socket for receiving a cleaner head in the form of a hollow pipe which is connected with the socket by a flexible hose. The pipe slides telescopically within the flexible hose so as to engage within the socket and to act as a handle. When located in the socket the pipe operates the valve device to connect the air passageway with the carpet engaging section.

18 Claims, 10 Drawing Figures

VACUUM CLEANING APPLIANCES

Matter enclosed in heavy brackets [ ] appears in the original patent but forms no part of this reissue specification; matter printed in italics indicates the additions made by reissue.

This invention relates generally to vacuum cleaning appliances and more particularly, but not exclusively, to portable electrically operated vacuum appliances intended for domestic use.

Vacuum cleaning appliances of this kind include an electrically driven fan whereby dust, grit and other dirt ingrained in a carpet is removed by suction, the dirt being deposited in a removable container such as a bag.

An upright-type cleaner of the above kind usually comprises a housing for the fan unit, the housing having a carpet engaging section which may incorporate rotatable brushes. The machine is usually manipulated by a rigid handle pivotally mounted on the casing of the appliance.

A cylinder type machine of the above kind usually comprises a main casing containing the fan unit and having an inlet opening for receiving a flexible hose to which suitable fittings may be attached.

An object of the present invention is to provide a vacuum cleaning appliance which incorporates the advantages of both types of machines and which is so constructed that the machine may be easily and quickly converted from one type to the other as desired. The cleaning appliance of the invention may therefore be used as an upright type machine movable over a carpet to be cleaned by means of its handle which in the preferred embodiments of the invention consists of a rigid tubular pipe member mounted within a flexible hose connected to the casing of the cleaner. In the upright operation of the cleaner the inner end of the pipe member is slidably projected through the surrounding flexible hose and is located within an opening in the casing to provide a rigid handle for maneuvering the machine. When so fitted the end of the pipe member seats within the opening in the casing so as to close the inner end of the pipe member and it furthermore acts to maintain open a spring operated valve member located in the passageway connecting the motor driven fan unit with the floor engaging section of the cleaner.

In order to convert the cleaner for cylinder type operation the handle is slidably removed from the opening in the casing so as to provide a rigid pipe member mounted within the end of the surrounding flexible hose connected to the casing. The removal of the pipe member from the opening in the casing furthermore releases the valve member which under the action of its spring closes off the connection between the fan unit and the carpet engaging section, and thereby communicates the fan unit directly with the hose member and its associated pipe member which now forms the carpet engaging member of the cleaner. In this mode of operation of the cleaner various attachments can be fitted to the end of the pipe member in accordance with conventional practice, for example for the cleaning of curtains and furniture.

A further related object of the invention is to provide the cleaner with an improved brush unit in the carpet engaging section of the appliance.

The features of the invention may be incorporated in any conventional vacuum cleaning appliance. However, in order that the invention may be clearly understood the features of the invention will now be described by way of example with reference to the accompanying drawings which illustrate a cyclone type vacuum cleaning appliance as described in my co-pending application Ser. No. 140,497, filed Apr. 15, 1980. In the accompanying drawings.

Figure 1:
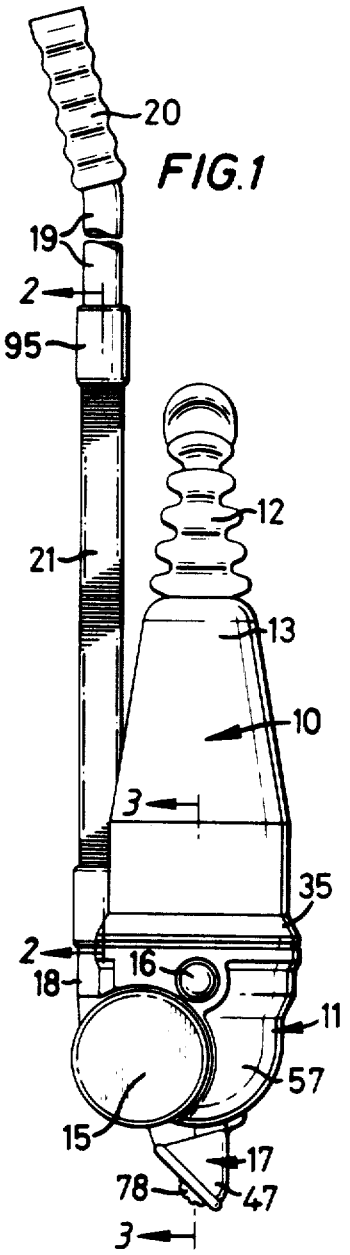
FIG. 1 is a side elevation of a vacuum cleaning appliance incorporating the features of the invention.

Referring now to FIG. 1 of the drawings, the vacuum cleaning appliance of the invention is shown in its upright mode of operation and it comprises a main casing 10 which is detachably fitted to the top of a casing 11 containing the electric motor and fan unit. The main casing 10 is provided with a rigid U-shaped carrying handle 12 which is connected at its ends to the opposite side portions 13 of the main casing. The motor casing 11 is fitted at opposite sides with a pair of supporting wheels 15 (see FIG. 3) for the appliance and the casing also includes an on-off push switch 16 for controlling the operation of the electric motor.

A lower cleaner head 17 for engaging a carpet to be cleaned is pivotally mounted on the motor casing 11 so that during use of the appliance the main casing may be pivoted relatively to the cleaner head 17 to allow the passage of the appliance under low furniture such as a bed.

The motor casing 11 is provided with an extension 18 which forms a rigid socket for slidably receiving the lower end of a tubular pipe or wand 19. The pipe 19 at its upper end is fitted with a hand grip 20 and forms a handle for manoeuvrering the appliance. The pipe 19 slidably fits within a stretch, retractable flexible hose 21 which is secured at its lower end around the upper open end of the extension 18 of the casing. The arrangement is such that the pipe 19 when fitted in the socket of the extension 18 enables the handle to be used for manoeuvrering the appliance as an upright type machine. When the pipe 19 is slidably removed from the socket in the extension 18 the pipe 19 is then used as a cleaner head at the end of the flexible hose 21 thus converting the appliance into a cylinder type machine. The fitting of the pipe 19 in hose 21 and the conversion of the appliance from one mode of operation to the other and vice versa will be described hereinafter in greater detail.

Figure 3:
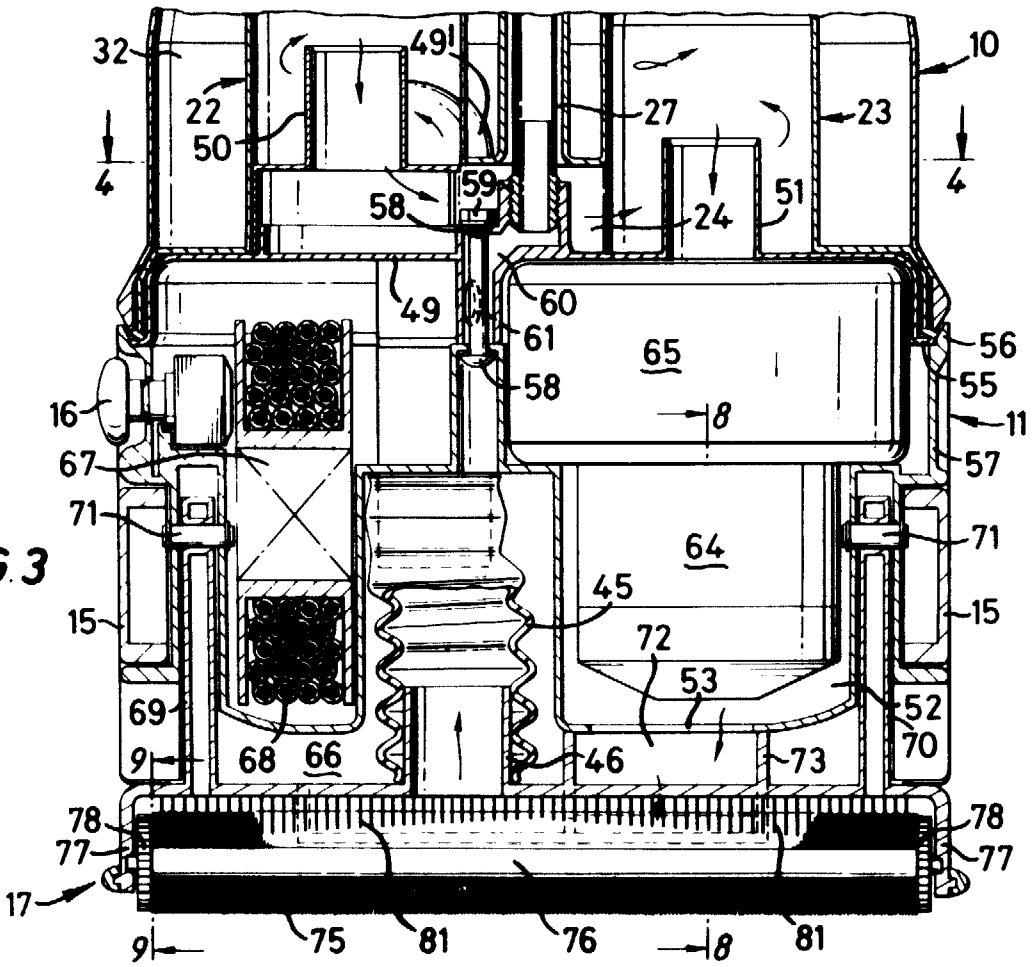
FIG. 3 is a section through a part of the vacuum cleaning appliance taken on the line 3—3 in FIG. 1.

FIG. 3 of the drawings provides a section through the lower part of main casing 10, motor casing 11 and cleaner head 17 of the appliance.

The main casing 10 provides a housing for the cleaner unit which may be of any conventional type including e.g. dust bags. In the drawing the cleaner unit consists of a pair of cyclones 22 and 23 which are located in series in the air flow through the appliance and which operate to remove by centrifugal action the dust and other dirt engrained in the air. The construction and operation of such cleaning units are described and claimed in my co-pending application.

Figure 4:
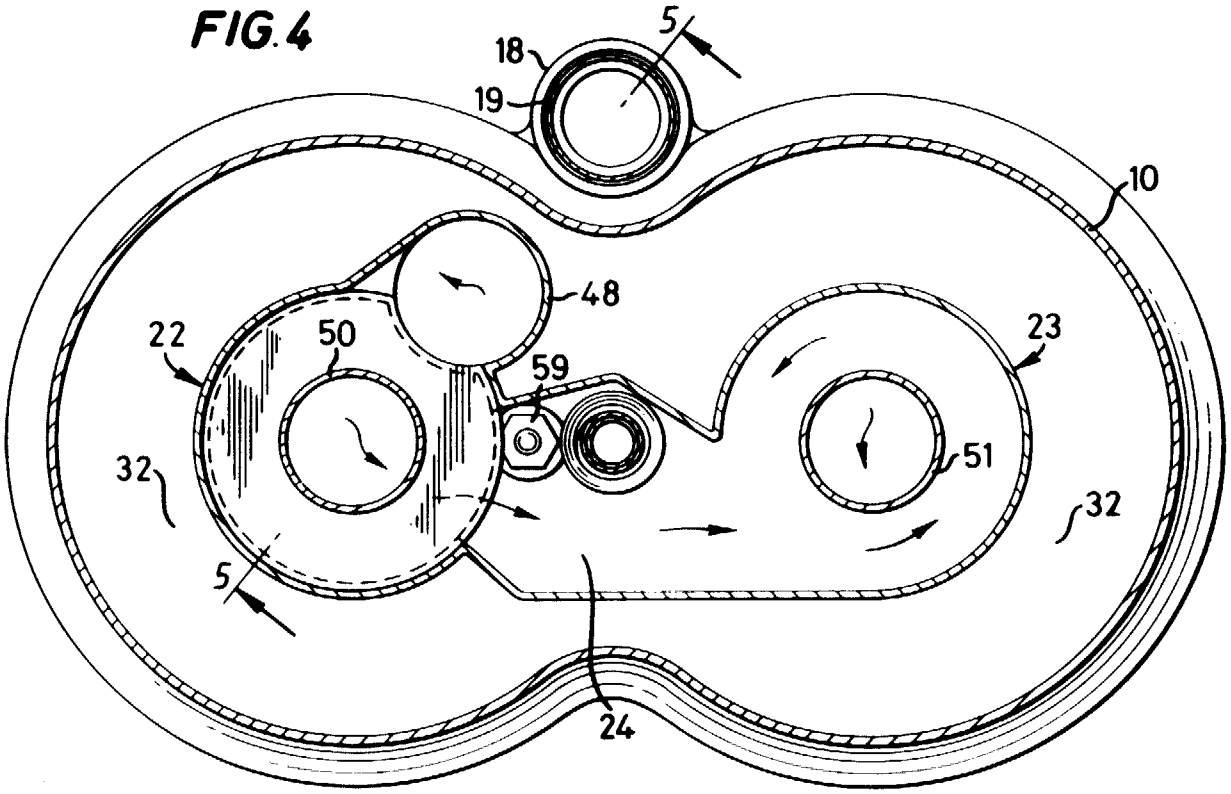
FIG. 4 is a horizontal section through the casing of the vacuum cleaning appliance taken on line 4—4 in FIG. 3 and showing the direction of air flow through the appliance.

The cyclones 22, 23 at their lower larger ends are interconnected centrally of the casing so as to provide an intercommunicating passageway 24 (see FIG. 4) for the air flow through the appliance.

The cyclones 22, 23 are spaced from the casing 10 to form therebetween and externally of the cyclones a chamber 32 for receiving dust and other dirt removed from the air flow by the cyclone units.

The air flow enters the main casing 10 through a flexible hose 45 which is attached to a short rigid pipe 46 opening into the casing 47 of the lower cleaner head 17. The hose 45 at its upper end is attached to a short rigid pipe 48 which extends through a horizontal plate 49, which plate is attached to and forms the top plate of the motor casing 11. The pipe 48 connects with a curved entry pipe 49 so as to direct the air flow as shown by the arrows into the base of the cyclone 22 in a tangential manner (see also FIGS. 4 and 5), the air then spiraling up the inner surface of the curved wall of the cyclone to deposit engrained dust and dirt by centrifugal action over the top edge of the cyclone.

The air flow then passes centrally down the cyclone into a pipe 50 formed in the top plate 49 and then enters the transverse passageway 24. The air flow then enters the lower part of the cyclone 23 also in a tangential manner (see FIG. 4) and is again processed in the cyclone so as to remove any further remaining fine dust and dirt.

Figure 8:
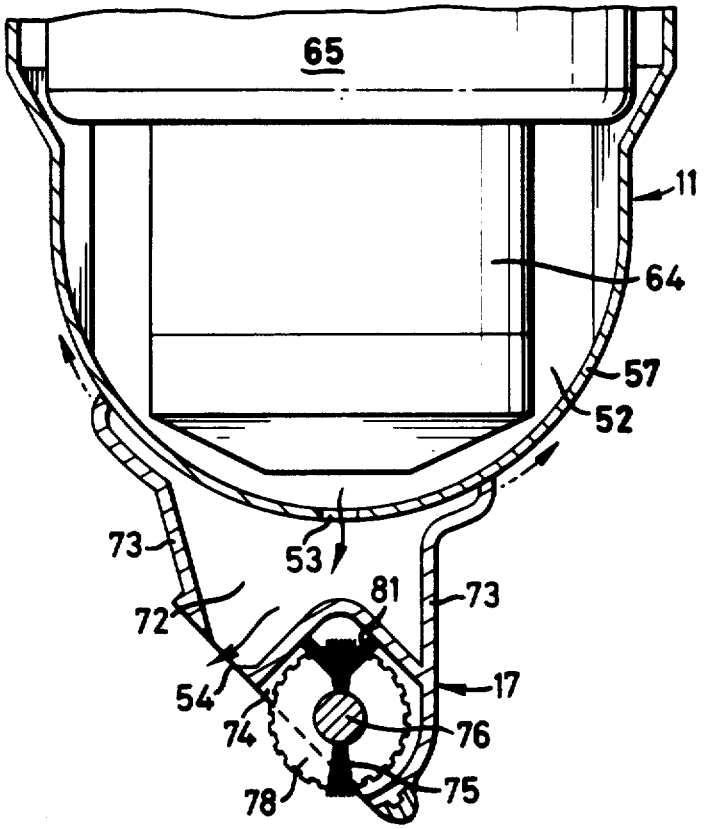
FIG. 8 is a section on the line 8—8 in FIG. 3 showing the carpet engaging section or cleaner head of the appliance.

The air flow then passes centrally down the cyclone 23 to enter a pipe 51 upstanding from the plate 49. The air flow exits from the pipe 51 into the fan and motor chamber 52 of the casing 11, and is then discharged through an aperture 53 into the cleaner head casing 47 from which it discharges into the carpet through an elongated slot 54 (see FIG. 8) formed in the casing. In an alternative construction the air flow may discharge directly into the atmosphere from a side slot in the casing.

The plate 49 forming the top plate of the motor casing 11 has an outer peripheral flange 55 which seats in the lip 56 of a housing 57 providing the lower part of the casing 11. The plate 49 is attached to the housing 57 by connecting bolt 58 and nut 59, the bolt extending through a chamber 60 which communicates with the inlet pipe 48 by means of an aperture (see FIG. 3). The chamber 60 also communicates with hollow shaft 27 which is provided with a control knob (not shown). The user of the appliance may progressively vent the inlet passageway of the appliance to atmosphere and so vary at will the degree of suction exerted on the carpet being cleaned. This control of the appliance is available whether the appliance is operating in its upright or cylinder mode of operation.

The casing 11 consisting of the top plate 49 and the housing 57 to which it is connected provides firstly the chamber 52 for the motor 64 and the fan 65, and secondly a chamber 66 in which is mounted a spring loaded reel 67 for the electric supply cable 68 of the appliance.

The lower cleaner head casing 47 is elongated in shape and extends across the width of the appliance having a pair of spaced upstanding arms 69 and 70 which are pivotally attached to the casing 11 by means of pivot pins 71 located within slots in the bottom housing 57. The casing 47 is provided with the exit pipe 46 previously mentioned and also formed with a chamber 72 provided by walls 73 upstanding from the casing 47 and which slidably engage the lower wall of the housing 57 around the aperture 53.

The cleaner head casing 47 furthermore has a longitudinal open-sided slot 74 in which is located a rotatable brush unit 75. The brush unit comprises opposite sets of bristles and is mounted on a longitudinal shaft 76 pivotally mounted in the end walls 77 of the casing. The shaft 76 also supports the plates 78 which are toothed and one of which comprises a ratchet which is engaged by a pawl 79 during one direction of rotation of the brush unit.

Figure 9:
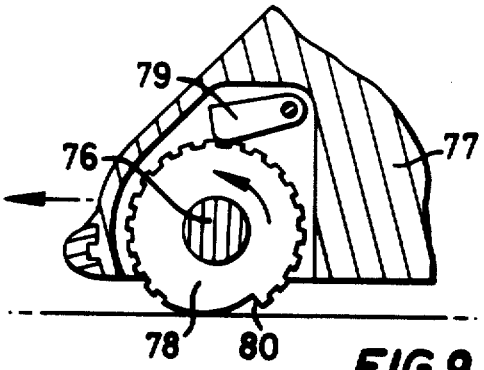
FIG. 9 is a part section on the line 9—9 in FIG. 3 showing the ratchet and pawl arrangement for rotating the carpet engaging brushes.
Figure 10:
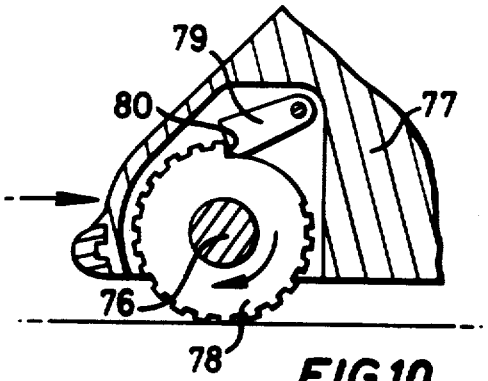
FIG. 10 is a part section similar to FIG. 9 but showing the operation of the ratchet and pawl during a reverse movement of the appliance over a carpet.

During forward movement of the appliance as shown in FIG. 9 the brush unit 75 rotates freely while in contact with the carpet, but during reverse movement as shown in FIG. 10 the pawl 79 engages a ratchet tooth 80 on the corresponding plate 78 so as to prevent reverse movement of the brush unit 75 and which thereby provides a brushing effect to the carpet. During rotation of the brush unit 75 during a forward movement of the appliance, the opposite sets of bristles preferably passed between spaced plates 81 (see particularly FIG. 3) so as to remove therefrom any accumulated fluff and other dirt which is then sucked into the appliance through the pipe 46.

As previously mentioned the vacuum cleaning appliance of the invention as shown in the drawings is primarily intended for operation as an upright type cleaner, the appliance being manoeuvred by the handle 20 on the end of the tubular pipe 19 which fits the socket in the extension 18 of the motor casing 11.

The invention however provides that the appliance may be quickly and simply converted for operation as a cylinder type cleaner and vice versa, merely by the removal and insertion of the tubular pipe or wand 19 in the socket of the casing extension 18.

Figure 5:
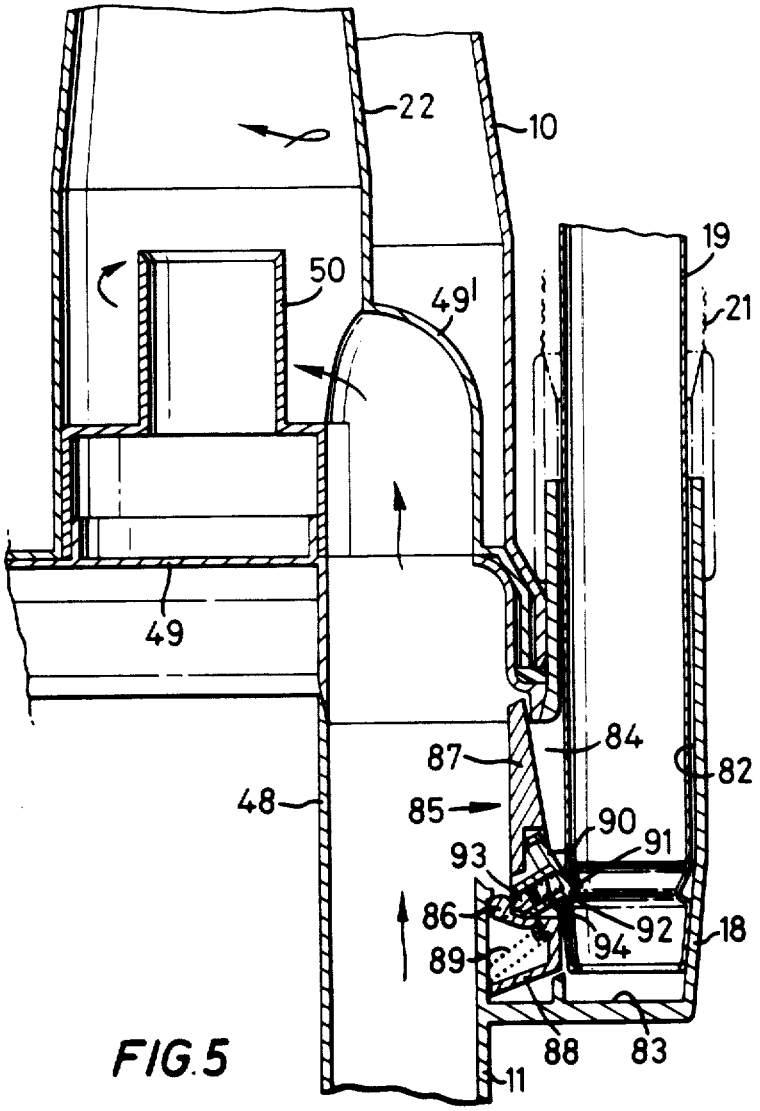
FIG. 5 is a section taken on the line 5—5 in FIG. 4 and showing the valve device controlled by the handle of the appliance for converting it from its upright mode of operation to its cylinder mode of operation and vice versa.
Figure 6:
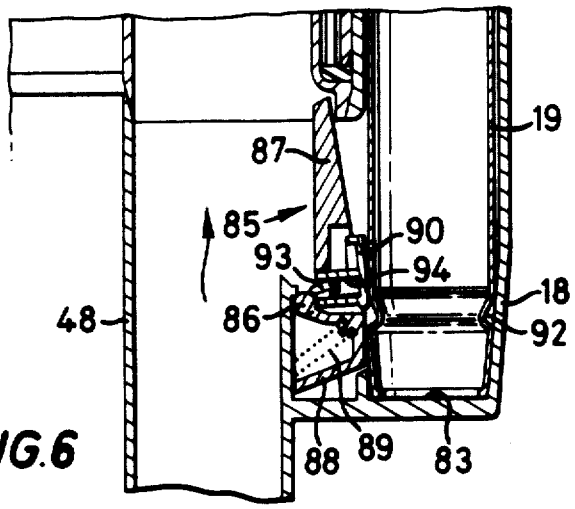
FIG. 6 is a part sectional view similar to FIG. 5 showing the valve device and tubular handle positioned for upright mode of operation of the appliance.
Figure 7:
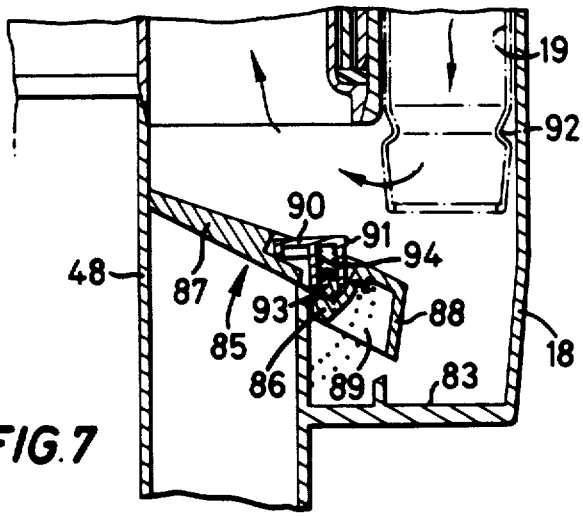
FIG. 7 is a similar part section showing the valve device positioned for cylinder mode of operation of the appliance.

The constructional features which enable this change over are shown more clearly in FIGS. 5 to 7 of the drawings.

FIG. 5 shows the pipe or wand 19 inserted in the extension 18 which provides an open socket 82 for slidably receiving the lower end of the pipe. The socket 82 provides an end seat 83 for the end of the pipe 19, but in its operating mode as an upright cleaner as shown in FIG. 5 the end of the pipe is held spaced from the seat 83 by a valve device shown generally by the reference 85.

The valve device 85 controls an aperture 84 in the side wall of the socket 82 which communicates the socket with the inlet pipe 48 of the appliance.

The valve device is pivotally mounted at 86 on the casing and it comprises a valve member 87 normally closing the aperture 84. At the other side of the pivot point 86 the valve device has an open sided housing 88 in which is mounted a compression spring 89 normally urging the valve device in an anti-clockwise direction to open the aperture 84. A switch member 90 is also mounted pivotally on the valve device and is movable relatively thereto. The switch member 90 is formed with a bore which contains a compression spring 94 acting against a slidable plunger 93.

When the appliance is in its upright mode of operation the pipe 19 is located as shown in FIG. 5 with the corner edge 91 of the switch 90 engaging a groove 92 in the pipe 19. In this position the valve member 87 has closed the aperture 84 and the plunger 93 has engaged a part of the pivot 86 which is on that side of the pivot line adjacent the housing 88. In this position the switch member 90 is locked into position so that anti-clockwise movement of the switch member and valve device is prevented and this retains the pipe 19 firmly in position to act as a handle to maneuver the appliance.

In order to convert the appliance to a cylinder type cleaner the pipe 19 is firstly pushed downwardly in the socket 82 into the seat 83 as shown in FIG. 6 of the drawings. As the pipe 19 moves downwardly the switch member pivots clockwise relatively to the valve device and this re-engages the plunger 93 on the opposite side of the line from the pivot 86. The plunger 93 now holds the switch member 90 in the position shown in FIG. 6 which allows for unrestricted removal of the pipe 19 upwardly from the socket 82.

As the pipe 19 moves upwardly the valve device 85 pivots anti-clockwise under the action of its spring 89 to the position shown in FIG. 7. In this position the valve member 87 engages the top edge of the wall of the pipe 48 to allow the plunger to re-engage the opposite side of the line from the pivot point 86 which thus allows anti-clockwise pivotal movement of the switch member 90 relative to the valve device. This sets the switch member for subsequent engagement with the pipe 19 when the pipe is reinserted in the socket 82 for conversion to the upright mode of operation of the appliance.

In this cylinder mode of operation as shown in FIG. 7 the pipe 19 is now connected through the aperture 84 directly with the passageway entering the cleaner unit. The valve member 87 now closes the inlet connection to the cleaner head and by slidably moving the pipe 19 to the end of the surrounding flexible hose 21 the open end of the pipe handle 20 can be used as a cleaner head and may be fitted with various attachments in the conventional manner. The pipe 19 is retained in a sealing tight manner in the outer end of the hose 21 by a cuff 95 which permits sliding of the pipe 19 and the locking therein of the end of the pipe by means of the groove 92.

Although in the preferred embodiment as described above the change-over from cylinder to upright mode of operation and vice versa is effected by movement of the wand handle it will be be understood that entirely separate control of the change-over valve may be incorporated in the appliance. For example, the valve device 85 may be actuated manually from the exterior of the casing or it may be controlled electrically from the handle of the appliance. In such arrangements the wand handle would be fitted in the flexible hose to engage the locating socket as previously described.

Figure 2:
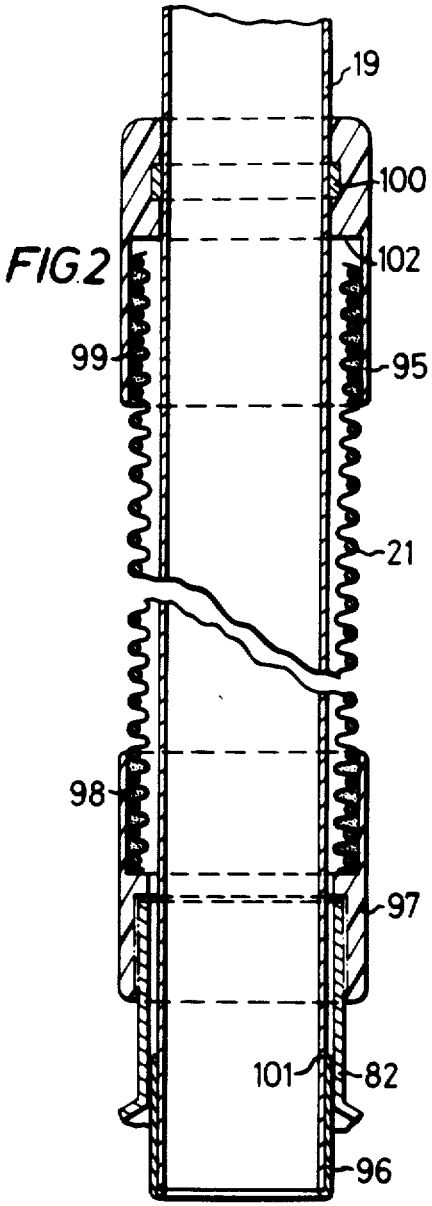
FIG. 2 is a section on the line 2—2 of FIG. 1 showing details of the handle construction.

Referring now to FIG. 2 of the drawings the pipe or wand 19 is slidably mounted in hose 21 and at its inner or lower end it is fitted with a fixed sleeve 96. The hose 21 is connected at its lower end to the socket 82 by a cuff 97, the hose having a PVC sleeve 98 bonded to the cuff. The upper end of the hose includes a further PVC sleeve 99 bonded to the cuff 95 which includes a felt or similar seal 100 in sliding contact with pipe 19. In FIG. 2 pipe 19 is shown in the inserted or upright mode of operation of the appliance. In the conversion of the appliance to its cylinder mode pipe 19 slides relative to cuff 95 until the upper edge 101 of sleeve 96 engages surface 102 of upper cuff 95. The arrangement prevents the removal of pipe 19 from hose 21 but the bevelled edge 101 enables the hose to be removed if required by force. The arrangement as described is of course applicable to any conventional cylinder type appliance for locating the wand when not in use.

In order to re-convert the appliance for upright mode of operation the pipe 19 is merely re-inserted slidably within the short upright tubular casing 82. This maneuver generally facilitated by closing the open end of the pipe handle 20 while the fan is operating, the resulting suction acting to straighten the hose 21 which enables the pipe 19 to be slidably moved therein without difficulty.

I claim:

1. A vacuum cleaning appliance comprising:

a main casing having an air passageway therein containing a motor driven suction fan unit, a floor engaging section containing a first inlet for dirt laden air and selectively communicating with said passageway, a second inlet for dirt laden air selectively communicating with said passageway, said second inlet comprising a socket, a tubular member having a first end coupled to said socket and a second end, a hollow pipe member at least partially housed within said tubular member, a lower end of said pipe member being detachably inserted into or removed from said socket, said lower end of said pipe member being connected with said socket through said tubular member when removed from said socket, an upper end of said pipe member extending beyond said second end of said tubular member and forming a handle for said appliance when said lower end of said pipe member is inserted into said socket, and a valve device operable in response to the insertion into or removal from said socket of said pipe member for connecting said passageway selectively with one of said first and second inlets.

2. A vacuum cleaning appliance as claimed in claim 1, wherein said valve device comprises a valve member which is pivotally mounted at a point of coupling of the socket with the air passageway, said valve member being spring urged normally into a position closing that part of said passageway communicating with said first air inlet in said floor engaging section.

3. A vacuum cleaning appliance as claimed in 2, wherein said valve member is engageable by said hollow pipe member when said lower end of said pipe member is inserted in said socket and is pivoted thereby to close the entrance of said socket with said air passageway.

4. A vacuum cleaning appliance as claimed in claim 3, wherein said valve member includes a catch device for fixedly engaging said lower end of said hollow pipe member when the latter is inserted in said socket so as to retain said pipe member in a position where it acts as a handle for the appliance.

5. A vacuum cleaning appliance as claimed in claim 4, wherein said catch device is pivotally mounted in said valve member and is adapted to hold said hollow pipe member with the lower end of said pipe spaced from the end of said socket, and said catch device is releasable by downward movement of said pipe member in said socket to pivot said catch device relative to said valve member and permit removal of the lower end of said pipe member from said socket.

6. A vacuum cleaning appliance as claimed in claim 1, wherein said tubular member is a flexible hose and said hollow pipe member is telescopically mounted within the flexible hose section.

7. A vacuum cleaning appliance as claimed in claim 1, wherein air passing through said fan unit is discharged into the atmosphere through a cleaner head provided at said floor engaging section.

8. A vacuum cleaning appliance as claimed in claim 7, wherein said cleaner head of the floor engaging section includes a rotating brush unit which includes a pawl device preventing rotation of the brush unit during one direction of movement of the appliance.

9. A vacuum cleaning appliance as claimed in claim 8, wherein the bristles of the brush unit pass between spaced plates during rotation so as to remove accumulated dirt.

10. A vacuum cleaning appliance comprising:

a main casing having an air passageway therein containing a motor-driven suction fan unit, a socket communicating with said passageway and providing an inlet for dirt laden air, a flexible hose section having a first end fixedly secured to said socket and a second end, and a hollow pipe member connected to slide telescopically within said flexible hose section, said hollow pipe member having a lower end which is engagable with said socket when said pipe member is fully retracted into said flexible hose section and with said second end of said flexible hose section when said pipe member is fully extended.

11. A vacuum cleaning appliance as claimed in claim 10, wherein said hollow pipe member is retained in said socket by a releasable catch device, said hollow pipe member when so located in said socket providing at an upper end thereof a handle for said appliance.

12. A vacuum cleaning appliance as claimed in claim 11, wherein said hollow pipe member functions as an inlet for dirt laden air when said lower end thereof is removed from said socket.

*13. A vacuum cleaning appliance comprising:*

*(a) a main casing having an air passageway therein containing a motor driven suction fan unit;*

*(b) a floor engaging section containing a first inlet for dirt laden air and selectively communicating with said passageway;*

*(c) a second inlet for dirt laden air selectively communicating with said passageway, said second inlet comprising a socket;*

*(d) a tubular member having a first end coupled to said socket and a second end and having a flexible section between said ends;*

*(e) a hollow pipe member at least partially housed within said tubular member, a lower end of said pipe member being detachably inserted into or removed from said socket, said lower end of said pipe member being connected with said socket through said tubular member when removed from said socket, an upper end of said pipe member extending beyond said second end of said tubular member and forming a handle for said appliance when said lower end of said pipe member is inserted into said socket; and*

*(f) a valve device operable for connecting said passageway selectively with one of said first and second inlets.*

*14. A vacuum cleaning appliance as claimed in claim 13, wherein said tubular member is a flexible hose and said hollow pipe member is telescopically mounted within the flexible hose section.*

*15. A vacuum cleaning appliance comprising:*

*(a) a main casing having an air passageway therein containing a motor-driven suction fan unit;*

*(b) a socket communicating with said passageway and providing an inlet for dirt laden air;*

*(c) a flexible hose section having a first end fixedly secured to said socket and a second end;*

*(d) a hollow pipe member connected to slide telescopically within said flexible hose section, said hollow pipe member having a lower end which is engageable with said socket when said pipe member is fully retracted into said flexible hose section and with said second end of said flexible hose section when said pipe member is fully extended; and*

*(e) said pipe having a portion extending beyond said flexible hose when said lower end is engaged with said socket and serving as a handle for maneuvering said vacuum cleaning appliance.*

*16. A vacuum cleaning appliance as claimed in claim 15, wherein said hollow pipe member is retained in said socket by a releasable catch device, said hollow pipe member when so located in said socket providing at an upper end thereof a handle for said appliance.*

*17. A vacuum cleaning appliance as claimed in claim 16, wherein said hollow pipe member functions as an inlet for dirt laden air when said lower end thereof is removed from said socket.*

*18. A vacuum cleaning appliance comprising:*

*(a) a main casing having an air passageway therein containing a motor driven suction fan unit;*

*(b) a floor engaging section containing a first inlet for dirt laden air and selectively communicating with said passageway;*

*(c) a second inlet for dirt laden air selectively communicating with said passageway, said second inlet comprising a socket;*

*(d) a tubular member having a first end coupled to said socket and a second end;*

*(e) a hollow pipe member at least partially housed within said tubular member, a lower end of said pipe member being detachably inserted into or removed from said socket, said lower end of said pipe member being connected with said socket through said tubular member when removed from said socket, and upper end of said pipe member extending beyond said second end of said tubular member and forming a handle for said appliance when said lower end of said pipe member is inserted into said socket; and*

*(f) a valve device mounted on the socket which opens and closes the second inlet and is actuated by insertion of the pipe member into the socket which moves the valve device.*

* * * * *